United States Patent
Hunter (10) Patent No.: US 6,722,933 B2
(45) Date of Patent: Apr. 20, 2004

(54) CLOSED LOOP CONTROL OF BOTH PRESSURE AND CONTENT OF BALLAST TANK GASES TO AT DIFFERENT TIMES KILL BOTH AEROBIC AND ANAEROBIC ORGANISMS WITHIN BALLAST WATER

(75) Inventor: Henry Hunter, San Marcos, CA (US)

(73) Assignee: MH Systems, Inc., San Diego, CA (US)

( * ) Notice: Subject to any disclaimer, the term of this patent is extended or adjusted under 35 U.S.C. 154(b) by 0 days.

(21) Appl. No.: 10/120,339

(22) Filed: Apr. 9, 2002

(65) Prior Publication Data

US 2002/0174814 A1 Nov. 28, 2002

Related U.S. Application Data

(63) Continuation-in-part of application No. 09/865,414, filed on May 25, 2001, now Pat. No. 6,539,884.

(51) Int. Cl.[7] .............................................. B63B 25/08
(52) U.S. Cl. ..................... 440/74 R; 210/757
(58) Field of Search ................ 114/74 R; 210/757, 210/764

(56) References Cited

U.S. PATENT DOCUMENTS

| | | | | |
|---|---|---|---|---|
| 4,338,874 A | * | 7/1982 | Shaw et al. | 114/50 |
| 5,092,259 A | * | 3/1992 | Husain | 114/74 R |
| 5,932,112 A | * | 8/1999 | Browning, Jr. | 210/750 |

* cited by examiner

Primary Examiner—Jesus D. Sotelo
(74) Attorney, Agent, or Firm—Fuess & Davidenas (57) ABSTRACT

The ullage space gases of a ship's ballast tanks (i) are depressurized to a pressure less than atmosphere—called an "underpressurized" condition—of most preferably about 14.7 PSIA or lower, simultaneously that (ii) they are inerted, preferably to <4% $O_2$ and more preferably to <2% $O_2$. Oxygen within the ballast water is rapidly, preferably within hours, substantially depleted, preferably to <1% PPM and more preferably to <0.6 PPM, by circulating these inerted ullage space gases through the ballast water as bubbles, removing oxygen from the ballast water more by outgassing than by diffusion. The rapidly de-oxygenated ballast water is preferably so maintained for the substantial portion of the ship's voyage, which is effective in killing most aerobic aquatic life within the ballast water. The ballast tanks may then be re-pressurized to atmosphere or above while oxygen-containing mixed gases, normally air, are bubbled through the ballast water, shocking and killing anaerobic aquatic life.

19 Claims, 2 Drawing Sheets

Table 1. Solubility of Oxygen in Water (Fresh and Saline)
Exposed to Water-Saturated Air at Sea Level
760 mm Hg (101.3 kPa)

| Temp (°C) | Chlorinity (freshwater) | Oxygen Solubility (mg/L) | | | | |
|---|---|---|---|---|---|---|
| | | 5.0 | 10.0 | 15.0 | 20.0 | 25.0 |
| 0.0 | 14.621 | 13.728 | 12.888 | 12.097 | 11.355 | 10.657 |
| 1.0 | 14.216 | 13.356 | 12.545 | 11.783 | 11.066 | 10.392 |
| 2.0 | 13.829 | 13.000 | 12.218 | 11.483 | 10.790 | 10.139 |
| 3.0 | 13.460 | 12.660 | 11.906 | 11.195 | 10.526 | 9.897 |
| 4.0 | 13.107 | 12.335 | 11.607 | 10.920 | 10.273 | 9.664 |
| 5.0 | 12.770 | 12.024 | 11.320 | 10.656 | 10.031 | 9.441 |
| 6.0 | 12.447 | 11.727 | 11.046 | 10.404 | 9.799 | 9.228 |
| 7.0 | 12.139 | 11.442 | 11.783 | 10.162 | 9.576 | 9.023 |
| 8.0 | 11.843 | 11.169 | 10.531 | 9.930 | 9.362 | 8.826 |
| 9.0 | 11.559 | 10.907 | 10.290 | 9.707 | 9.156 | 8.636 |
| 10.0 | 11.288 | 10.656 | 10.058 | 9.493 | 8.959 | 8.454 |
| 11.0 | 11.027 | 10.415 | 9.835 | 9.287 | 8.769 | 8.279 |
| 12.0 | 10.777 | 10.183 | 9.621 | 9.089 | 8.586 | 8.111 |
| 13.0 | 10.537 | 9.961 | 9.416 | 8.899 | 8.411 | 7.949 |
| 14.0 | 10.306 | 9.747 | 9.218 | 8.716 | 8.242 | 7.792 |
| 15.0 | 10.084 | 9.541 | 9.027 | 8.540 | 8.079 | 7.642 |
| 16.0 | 9.870 | 9.344 | 8.844 | 8.370 | 7.922 | 7.496 |
| 17.0 | 9.665 | 9.153 | 8.667 | 8.201 | 7.770 | 7.356 |
| 18.0 | 9.467 | 8.969 | 8.497 | 8.049 | 7.624 | 7.221 |
| 19.0 | 9.276 | 8.792 | 8.333 | 7.896 | 7.483 | 7.090 |
| 20.0 | 9.092 | 8.621 | 8.174 | 7.749 | 7.346 | 6.934 |
| 21.0 | 8.915 | 8.456 | 8.021 | 7.607 | 7.214 | 6.842 |
| 22.0 | 8.743 | 8.297 | 7.873 | 7.470 | 7.087 | 6.723 |
| 23.0 | 8.578 | 8.143 | 7.730 | 7.337 | 6.963 | 6.609 |
| 24.0 | 8.418 | 7.994 | 7.591 | 7.208 | 6.844 | 6.498 |
| 25.0 | 8.263 | 7.850 | 7.457 | 7.083 | 6.728 | 6.390 |
| 26.0 | 8.113 | 7.711 | 7.327 | 6.962 | 6.615 | 6.285 |
| 27.0 | 7.968 | 7.575 | 7.201 | 6.845 | 6.506 | 6.184 |
| 28.0 | 7.827 | 7.444 | 7.079 | 6.731 | 6.400 | 6.085 |
| 29.0 | 7.691 | 7.317 | 6.961 | 6.621 | 6.297 | 5.990 |
| 30.0 | 7.559 | 7.194 | 6.845 | 6.513 | 6.197 | 5.896 |

FIG. 2 PRIOR ART

CLOSED LOOP CONTROL OF BOTH PRESSURE AND CONTENT OF BALLAST TANK GASES TO AT DIFFERENT TIMES KILL BOTH AEROBIC AND ANAEROBIC ORGANISMS WITHIN BALLAST WATER

REFERENCE TO A RELATED PATENT APPLICATION

The present application is related as a Continuation-In-Part (C-I-P) to U.S. patent application Ser. No. 09/865,414 filed May 25, 2001, for CLOSED LOOP CONTROL OF VOLATILE ORGANIC COMPOUND EMISSIONS FROM THE TANKS OF OIL TANKERS, INCLUDING AS MAY BE SIMULTANEOUSLY SAFEGUARDED FROM SPILLAGE OF OIL BY AN UNDERPRESSURE SYSTEM, now issued as U.S. Pat. No. 6,539,884.

BACKGROUND OF THE INVENTION

1. Field of the Invention

The present invention generally concerns the simultaneous control of both (i) the pressure and (ii) the content of ship's ballast tank gases to at different times kill both aerobic and anaerobic organisms within ballast water The present invention particularly concerns establishing (i) a pressure less than atmosphere, called an "underpressure", in the ullage spaces of ship's ballast tanks, and (ii) rendering inert the (underpressurized) ullage space gases of the ballast tank.

The present invention further particularly concerns accomplishing the (ii) inerting in a manner where dissolved gases in the ballast tanks' water will, in accordance with Henry's gas, (1) rapidly come into equilibrium with the inerted atmosphere of the ullage spaces, and (2) become sufficiently depleted in oxygen so as to broadly induce hypoxia in marine organisms within the ballast water. This condition can be indefinitely maintained.

The present invention still further particularly concerns optionally reversing this anoxic condition, and equally rapidly manipulating the ballast tank ullage space gases, and restoring such oxygen, to the ballast water as is commonly fatal to anaerobic marine organisms.

2. Description of the Prior Art
2.1 The Problem of the Importation of Exotic Species in Ship's Ballast Water Many survey articles exist regarding the present, and potential, damage to the marine environment arising from the invasions of exotic, non-native, marine species within discharged ship's ballast water. One such article appears in the Gulf of Maine Times, Vol. 2, No. 2 as "Ballast water a vehicle for exotic species invasions", and is excerpted below.

In that article it is explained that ballast water pumped onto a ship while it is in port contains marine species native to that area. When the water is later discharged into another port, those organisms can colonize there, affecting the ecosystem.

"Once every hour, about two million gallons [7.6 million liters] of ballast water which equals two million gallons of plankton from foreign ports is released in U.S. coastal waters. We refer to this as marine ecological roulette," said James T. Carlton, professor of marine sciences at Williams College in Williamstown, Mass. He noted that the National Research Council in 1995 ranked exotic species invasion as one of five major issues in marine ecosystems management.

Ballast water is a necessary component of shipping. "When cargo is unloaded, the ship floats high like a cork. You put 15 to 35 thousand tons [13 to 32 thousand metric tons] of ballast water into it, depending on the size of the ship, to weight the ship to counteract the buoyancy, which gives the ship better stability and maneuverability," explained Kevin Collard, Director of Operations, Environment and Safety for Marbulk Shipping, an international shipping company based in Salem, Mass.

But in an effort to prevent invasions of coastal ecosystems by non-native species, shippers are being urged to exchange their ballast water in the open ocean, so that the water they discharge into their next port does not contain organisms from their last one.

"The actual process which makes exchanging ballast water at sea effective is, you replace coastal water organisms with [less adaptable] mid-ocean organisms, which are less likely to survive in coastal waters," said Lt. Larry Greene, Aquatic Nuisance Species Control Program manager for the U.S. Coast Guard (USCG).

Invaders can be devastating. "A typical ballast tank could be the size of an auditorium that seats 700 people," said Carlton. When ballast water transfer takes place in port, the discharged water can introduce what he described as a "staggering diversity of living organisms," to coastal waters, including non-native aquatic organisms and pathogens, such as cholera.

Not all of these organisms will survive in their new surroundings, but some are extremely hardy, have no natural predators in their new environment, and multiply profusely. Some invasive organisms can become toxic, posing threats to other species, aquaculture stocks, and humans. Non-native aquatic organisms can also crowd out native species by reducing the food supply or changing characteristics of the habitat.

The infamous European zebra mussel's introduction into the North American Great Lakes, and its subsequent spread to central U.S. rivers, has jeopardized commercial and recreational fisheries, and caused expensive infrastructure problems. The mussels consume huge amounts of microscopic plants and animals, reducing available food for other species, and they have become so prolific that power plants and water delivery systems have been forced to spend millions of dollars on removing them from underwater structures and water pipes.

In the Gulf of Maine, the European green crab, European periwinkle, Japanese sputnik weed, and grey and orange sea squirts, are all non-native species. Fortunately, none have caused problems on the scale of the troubles brought by the zebra mussel. Nevertheless, cautioned Carlton, without precautions, "It's only a matter of time until we register a front-page, major invasion in the Gulf of Maine. We are not able to predict what it will mean, so we'd rather it not happen."

Mandatory compliance is coming. The International Maritime Organization (IMO) in 1991 adopted voluntary guidelines for preventing marine species invasions via ballast water, and is developing mandatory guidelines that may be approved as soon as 2000, although ratification may take several years.

Meanwhile, shippers entering U.S. ports were given three years to voluntarily comply with open ocean ballast water exchange guidelines under the U.S. National Invasive Species Act of 1996, which is enforced by the USCG. The Act states that shippers should exchange ballast water at sea unless "that exchange threatens the safety or stability of the vessel, its crew, or its passengers." Reporting of ballast water exchange is now mandatory.

Researchers are exploring remedies for ballast water issues. Allegra Cangelosi, Senior Policy Analyst and co-principal investigator with the Great Lakes Ballast Technology Demonstration Project, is testing the effectiveness of filtering organisms from ballast water.

Open-ocean ballast water exchange is simply not feasible in all cases due to weather conditions, routing, or a ship's structure, Cangelosi said. "We are in desperate need of more broadly applicable approaches," she said, adding that her organization is "looking for technologies that can be used anywhere on the globe," including the Gulf of Maine.

Battelle Memorial Institute, a not-for-profit international organization, is also researching ways of treating ballast water as it is pumped onto a vessel to kill the organisms in the water, including ultrasonic treatment, irradiation, and heating the water, said Deborah Tanis, a research scientist based in Battelle's Duxbury, Mass. office.

Treating ballast water chemically may also be an option, but Carlton said, "We want to be conservative with biocides and cautious about diverting more chemicals into the system unless they have a very short half-life and are biodegradable."

Though open-ocean exchanges are currently the accepted method for handling potentially contaminated ballast water, both Tanis and Cangelosi agree that other options are needed. Said Tanis, "We need methods that are more effective than ballast water exchange and more feasible for shippers. We're studying the actual biological effectiveness of exchanges. It certainly will help, but I don't know that it's 100 percent foolproof. There's a need to bridge the gap between science and industry, and that means we need to come to some determination that benefits both."

2.2 Ballast Water Treatment Options

Ships use ballast water to provide stability and maneuverability during a voyage. Water is taken on at one port when cargo is unloaded and usually discharged at another port when the ship receives cargo. Because organisms ranging in size from viruses to twelve inch fish living in the surrounding water or sediments are taken on board with ballast water, there is a potential for the introduction of non-native organisms—called bioinvaders, alien species, non-indigenous species or exotic species—into the port of discharge.

A number of methods to prevent these unwanted introductions are under various stages of test and development worldwide. Unfortunately no single ballast water management technique has been as of yet been able to remove all organisms or all types of organisms from ballast tanks in a practical manner. A combination of different methods may prove to be more effective than one method alone, however little research has been conducted into this possibility.

It is difficult to implement treatments because ship owners are understandably reluctant to install technology that is expensive, unreliable, or time consuming.

The criteria for selecting a ballast water treatment method include (i) safety of the crew and passengers, (ii) effectiveness of the method at removing target organisms, (iii) Ease of performing the treatment method, and any equipment(s) involved, (iv) the amount of interference with normal ship operations and travel times, (v) any influence(s) on the structural integrity of the ship, (vi) the size, expense, reliability and maintainability of any treatment equipment (s), (vii) the amount of potential damage to the environment, (viii) the ease for port authorities to monitor for compliance with regulations, and (ix) cost effectiveness. When evaluating ballast water treatment options the foremost among these general factors appear to be cost, enforcement, the effectiveness of the method, and the risks the treatment may pose to human health and the environment.

The monetary cost of a treatment method includes the expense of the equipment, the crew needed to operate the treatment equipment, and the time needed for the treatment operation. Many treatment methods require that ships be retrofitted with the necessary equipment or that new ships have the equipment included in their design, both of which may be quite expensive. Because crew members have many tasks to perform on a ship, any crew that is needed to operate the treatment may decrease the number of crew members that are available for other ship operations. If a treatment method slows down the journey of a vessel or causes excess fuel consumption the journey will be more expensive. Any treatment method should provide means for port authorities to easily monitor whether or not the treatment has been performed and if it was effective. This allows for enforcement of any laws regarding ballast water treatment. Because many treatment methods work by killing the organisms in ballast water, the method itself may pose a risk to human health or to the environment if the treatment is not properly contained in the ballast tanks. All these risks and costs need to be evaluated and compared to the risk of introducing species to a port.

2.2.1 Ballast Water Exchange

Current ballast water regulations usually recommend minimizing the risk of introducing non-native species by exchanging ballast water in the open ocean. This method is effective because organisms from coastal waters are unlikely to survive in the open ocean and vice versa. Drawbacks to this method are: (1) it is difficult to completely remove sediments and residual water from the bottom of ballast tanks; (2) organisms stuck to the sides of the tank or structural supports within the tank will not be readily removed; and (3) during stormy or rough seas it is unsafe for a ship to exchange ballast water. Thus, organisms remaining inside the ballast tanks may be discharged at a later time into ports and harbors if the exchange fails to remove all organisms.

In actual operation, an exemplary ballast water exchange might transpire as follows. A ship leaves a port in the Indian Ocean, travels through the Suez Canal, discharges cargo in the Mediterranean and takes up ballast water prior to crossing the Atlantic Ocean. Ballast water exchange would occur in the Atlantic prior to the ship entering the Great Lakes to pick up cargo, e.g. wheat for transport to the receiving port.

There are also advantages to ballast tank exchange. Because it is done while the ship is en route, relatively little time is lost during the voyage. No additional equipment or operator training is needed for ballast exchange so the capital costs are low and it is a simple process to implement. Enforcement of ballast exchange laws can occur to some degree because open ocean waters have higher salinity levels than coastal waters and this difference can be detected by port authorities. In addition, Battelle, a research institution, is developing a quick and easy test for determining if ballast water exchange has occurred.

The effectiveness of ballast water exchange could be improved by redesigning ballast tanks and pumping systems. Currently, most ballast tanks have one pipe that pumps water in both directions, but not at the same time. With the addition of another pipe, ballast exchange could be achieved by continual flushing of the tank with one pipe bringing water into the tank and another pipe allowing water to exit the tank. This could also be a safer means of exchanging ballast because the tanks would contain water at all times. Another means of improving current ballast tank flushing would be to remove the residual water and sediments from the bottom of ballast tanks. Pumps, which are relatively inexpensive, could be installed in the bottom of ballast tanks to remove these residual materials, thereby reducing the risk of introducing a non-native species. Ballast tanks could also be redesigned with a sloping bottom or other structure that allows sediment and water to drain into a pump. Current ship designs often include structural supports and odd corners in the ballast tanks that trap organisms and ballast water. The possibility of trapping organisms in ballast tank structures could be reduced by designing ships that do not have these structures, redesigning these structures so they do not trap ballast water and organisms, or by installing small pumps in these areas to remove water during ballast exchange.

The present invention will be seen to substantially obviate these problems, being that no ballast water exchange transpires.

2.2.2 Oxygen Deprivation/Deoxygenation of Ballast Water in General

There has been some limited research and discussion on using oxygen removal to kill organisms in ballast water tanks. The test of this method known to the inventor was as a trial with shore-based facilities. A system that used a vacuum in an auxiliary chamber to a simulated ballast tank—the Aquahabistat system—was tested in a shore-based scale facility for its potential to remove oxygen from ballast water. See Gordon and Horeth, 2001.

Tamburri, et al. (2001)—discussed further in section 2.2 below—describes how purging of oxygen from ballast water tanks using nitrogen has been effective at reducing corrosion. He proposes this method would also be effective in killing organisms in ballast tanks that can't survive at low oxygen concentrations.

Oxygen removal as a treatment method for ballast water can mainly be achieved through four ways; 1) addition of nutrients to stimulate growth of bacteria and thus oxygen consumption; 2) adding sodium metabisulfite; 3) bubbling nitrogen gas through the water to replace the oxygen; or 4) using a vacuum.

Oxygen removal through the addition of nutrients will result in ballast water that is rich in nutrients being discharged to the environment. This could contribute to increased eutrophication.

Oxygen removal through addition of sodium metabisulfite could have adverse effects such as production of hydrogen sulphide in the absence of oxygen, and of sulphur release at discharge.

Addition of nitrogen gas seems to have no adverse effects on the environment, but is as of present (circa 2002) still on experimental level (Tamburri et al , 2001).

2.2.2.1 Ballast Water Deoxygenation

Work on ballast water deoxygenation is reported in the Proceedings of the Second International Conference on Marine Bioinvasions, New Orleans, La., Apr. 9–11, 2001, pp. 134–135 by Messrs. Tamburri, M. N., K. Wasson, and M. Matsuda, of the Monterey Bay Aquarium Research Institute in their paper "Ballast Water Deoxygenation Can Prevent Species Introductions while Reducing Ship Corrosion" (2001).

They report that one of the most important mechanisms for the introduction of aquatic nuisance species is transport in ship ballast waters (National Research Council 1996), and, that although several ballast tank treatments to prevent transport of aquatic organisms appear promising, all existing approaches will result in significant costs to the shipping industry.

Tamburri, et al. find that successful ballast water treatment technologies should meet the following important criteria: 1) effectiveness at killing potentially damaging invaders, 2) safety for shipboard crew, 3) environmentally benigness, and 4) affordability for ship owners. Deoxygenation is judged to partially meet the first criterion by being highly effective at killing animal invaders (larval, juvenile and adult forms) but may be less effective for other taxa, particularly those adapted to low oxygen environments or with resistant stages such as cysts. Second, with proper equipment and training, nitrogen poses no major threats to crew safety. Third, nitrogen is relatively benign when discharged. Hypoxic ballast water would likely mix rapidly with shallow oxygenated water in harbors, and therefore create little danger for native estuarine organisms, which can withstand brief reductions in oxygen levels. Finally, ballast water admirably meets the fourth criterion. Rather than an added expense for ship owners, it actually represents a net saving, due to the significant decrease in corrosion.

The National Research Council evaluated 10 candidate technologies for shipboard treatment of ballast water and concluded that intensive filtration, use of biocides, and thermal treatments held the most promise. See National Research Council. 1996. Stemming the tide: controlling introductions of non-indigenous species by ship's ballast water. National Academy Press, Washington, D.C., 141 pp.

Deoxygenation did not receive high priority because of its failure to kill organisms resistant to hypoxia. However, Tamburri, et al. find that while other ballast water treatment options may be more comprehensively effective, they come at greater environmental and financial cost. For instance, biocides may be hazardous for the crew as well as for native organisms in the vicinity of the ballast discharge. Moreover, these techniques are found come at a significant price for ship owners, and it is projected that, until mandated to do so, the shipping industry is unlikely to voluntarily install expensive ballast water treatment technologies.

In contrast to this situation, Tamburri, et al. propose the widespread voluntary adoption of nitrogen treatment of ballast water based on its alleged auxiliary economic benefit of controlling corrosion ballast water tank corrosion. Tamburri, et al. describe a treatment alleged to dramatically reduce the survivorship of most organisms found in ballast waters while providing economic benefits to ship owners. This technique is based on the purging of oxygen from ballast tanks with nitrogen—as will seen to be part of the present invention. As well as killing aerobic marine life in ballast water, the deoxygenation was found to be a cost-effective technique for reducing corrosion in the ballast tanks, decreasing the rate of rusting up to 10% of untreated ballast tanks.

Testing the survivorship of many organisms found in ballast waters to the deoxygenation technique, the tolerance of larvae from known invasive invertebrate species (*Ficopomatus enigmaticus, Dreissena polymorpha, Carcinus meanas*) to oxygen levels found in nitrogen-treated ballast tanks was investigated, and significant levels of mortality were detected. This is consistent with two separate literature reviews investigating oxygen tolerance for various aquatic species and concluding that few organisms will be able to withstand extended periods of exposure to deoxygenated ballast water.

The present invention will be seed to induce rather more hypoxic conditions in ballast water than does the method of Tamurri, et al., and introduces these conditions much faster. Although tests on the induced fatalities of marine organisms are not yet available for the system and method of the present invention, it is axiomatic that aerobic organisms needing oxygen to live will be more severely killed by the more profound deprivations for the more extended periods realized by the present invention.

2.2.2.2 Effectiveness of Oxygen Deprivation

The Cawthron Institute at 98 Halifax Street East, Private Bag 2 Nelson, New Zealand, reports in 1999 the potential for the use of oxygen deprivation as a treatment option for infected ballast water.

Adult samples of the starfish *Coscinasterias calamaria*, the zoospores of the seaweed *Undaria pinnatifida*, and the larvae of *Crassostrea gigas* were used for laboratory study of effects of nitrogen, sulphide and glucose in killing the sample organisms through oxygen depletion.

The study concluded that lowering the level of oxygen to less than 3 mg l (−1) leads to effective kills of *Undaria* zoospores and *Coscinasterias calamaria* larvae. However, more research was deemed to be required both into the species range affected by deoxygenation and into the practicality of the various methods before shipboard investigations of this technology can be conducted.

2.2.3 Gas Supersaturation

Gas supersaturation is also relevant to the present invention. Gas supersaturation is based on exposing organisms to gas supersaturated water, which can cause them to suffer embolism and hemorrhages. This condition can be lethal if there are high levels of supersaturation. See Jelmert and Jelmert, 2001. Gas supersaturation has been studied in laboratory tests.

Gas supersaturation is known to affect various aquatic biota. When aquatic multicellular organisms are exposed to gas supersaturated water, and especially when subsequently subjected to lowered hydrostatic pressures, they suffer from embolism and hemorrhages. If the level of supersaturation is high enough, the condition may be lethal. Also sublethal exposures represent a considerable stress to the organisms. While lethal effects occasionally have been observed in natural or semi natural conditions, it is hypothesized by Jelmert and Jelmert that supersaturation might be optimized and used to treat ballast water. This method is still in a preliminary stage of development in laboratory scale circa 2002, not permitting assessment of its indirect environmental impacts. However, the corrosive effects of this treatment method have to be further studied and properly evaluated, as noted by Bureau Veritas, 2001. Also the discharge of dead organisms can have an effect on the marine ecosystem, and increase eutrophication.

2.3 Summary

Ballast water is one of the major pathways of marine biological invasion throughout the world. Removing aquatic organisms from ballast water is a promising way to prevent the introduction of bioinvaders that cause ecological and economic harm. Until recently, preventing ballast water release of non-native species was a low priority. As a result, many of the treatment options are still in the experimental stage. Because installing new technologies or retrofitting ships is expensive, ship owners are reluctant to use a new technology unless it is proven effective. This, in turn, has created further delays in adopting regulations and implementing changes in how ships manage ballast water releases. See, for example, Carlton, James T. and Bridget A. Holohan, eds. March 1998. U.S.A. Ballast Book 1998–1999. See also Ballast Research in the U.S.A.; National Research Council, 1996. See also Stemming the Tide: Controlling Introductions of Non-indigenous Species by Ships' Ballast Water, 141 pages, Oemcke, Darren J. and J.

SUMMARY OF THE INVENTION

The present invention contemplates a synergistic approach to the treatment of ship's ballast water in order to kill harmful marine organisms. Synergism is derived by (i) maintaining the ullage spaces of the ballast tanks at a pressure less than atmosphere—called an "underpressurized" condition—simultaneously that (ii) the ullage space gases are inerted, meaning that at least at one time and preferably for the substantial duration of a ship's voyage, the percentage oxygen in the ullage space gases is reduced below normal atmospheric percentage, and below a level that will, ultimately, sustain aerobic life, including (by gaseous exchange occurring with the inerted ullage gases) aerobic marine life within the ballast water.

It does not matter for purposes of the present invention whether the (ii) inerted, oxygen-depleted, condition of the ullage space gases is realized by (1) extraction of oxygen, or by (2) addition of gases, primarily nitrogen, other than oxygen. Preferably flue gases, which are substantially devoid of oxygen and which are primarily nitrogen, are simply added to the ballast tank ullage space to cost effectively dilute the oxygen content of the ballast tank ullage space gases.

The (i) underpressurized condition of the ballast tank ullage space is realized by simply pumping its gases to atmosphere. Clearly as much gas, and more, than is added in order to inert the ballast tank ullage space must be pumped out in order to reduce the pressure of the remaining ballast tank ullage space gases below atmosphere.

The (i) underpressurized (ii) de-oxygenated condition thus induced in the ballast tank ullage space gases will—by a gas exchange mechanism of outgassing that is of superior effectiveness to gas diffusion, and later to be explained—will in turn induce such a de-oxygenated condition in the ballast water as will effectively kill a wide range of aerobic aquatic life contained within this ballast water.

Conversely, it is possible at a later time to (i) momentarily pressurize the same ullage space of the same ballast tank to greater than atmosphere pressure while simultaneously (ii) maintaining the oxygen content of the gases of this ullage space to be at least as high as within the atmosphere. The re-oxygenated condition thus induced in the ballast water kills anaerobic aquatic life.

1. Synergistic Depletion of Oxygen in Ballast Water

Why the present invention works with superior effectiveness to quickly and economically remove oxygen from ballast water demands an understanding of the gas laws.

Gases dissolved in any fluid will, by operation of Henry's gas law, ultimately assume both (i) concentration and (ii) proportions respective of (i) the pressure and (ii) the proportions of the gases over the fluid. When the gases of a ballast water tank's ullage space is inerted in accordance with the present invention than the ballast water will ultimately, by operation of Henry's gas law, become depleted in oxygen, and anoxic.

Alas, this process is normally very slow. In particular, the diffusion of dissolved gases in water (and other fluids) is approximately ten thousand times (×10,000) slower than in air. If the dissolved gases within ballast water are to be depleted of oxygen merely by such interchange with inerted ullage space gases will primarily transpire in a shallow layer at the top of the tank, while dissolved oxygen at lower depths must diffuse through tens of feet of water, then the delay in reaching equilibrium is of the order of weeks, and untenably long.

In accordance with the present invention gaseous interchange between (i) gases—including oxygen—originally within the ballast water and (ii) inerted gases within the ullage space of the ballast water tank is very greatly accelerated. This interchange is so accelerated by maintaining (1) an underpressure in the ullage spaces. By this operation alone the normal slow diffusion of gases from the ballast water is replaced by a rapid outgassing, being the process by which, upon reduction of pressure, gases (including oxygen) trapped within the ballast water spontaneously form into bubbles, and rise to the surface.

Moreover, in accordance with the present invention there preferably also simultaneously transpires (2) bubbling inert gas(es) (primarily nitrogen) upwards through the ballast water. This bubbling is necessarily at a pressure greater than the (under)pressure of the ullage space plus the head of ballast water, but is still most preferably done at a pressure that is less than atmosphere. (Some small thought by any reader skilled in the transfer of pressurized fluids and gases will reveal that the only way that (inert) gas(es) pressurized at less than atmosphere could possibly travel upwards through fluid would be if the gas pressure on top of the fluid was to be less than atmosphere—which, in accordance with the present invention, it is.)

Scavenging of gases that are within the ballast water transpires at the surfaces of these bubbles, which, if sufficiently numerous and small as is most desirable, have a combined surface area that is not only many multiples of the top surface area of the ballast water, but may be huge, and on the order of the size of an American football field.

By these operations the normal slow diffusion of ullage space gases into the ballast water by an interchange transpiring only at the top layer of ballast water, and gas diffusion, is replaced with (i) rapid outgassing—alone sufficient to deplete all gases including oxygen in the ballast water—plus (ii) gas transference over the large cumulative surface area of the (inert gas) bubbles.

The net result is that the ballast water becomes severely depleted of oxygen quite quickly, and on the order of hours; greatly stressing if not immediately (within the order of further minutes and hours) killing aerobic aquatic marine life (of all kinds) within the ballast water. Normally, and preferably, this oxygen-depleted condition of the ballast water is maintained for the substantial duration of the voyage of the ship.

2. Reversing the Process to Re-introduce Oxygen into the Ballast Water

The entire preferred process of de-oxygenation of ballast water in accordance with the present invention may be reversed so as to rapidly re-oxygenate the ballast water.

In accordance with operation of the gas laws that an ullage space pressure less than atmosphere "pulls" gases out of ballast water previously at equilibrium in atmosphere, introduction of an ullage space pressure greater than atmosphere will tend to "push" gases back into the ballast water (especially as may now be a equilibrium to a gas pressure less than atmosphere).

Unfortunately, there is no phenomena of "ingassing" as would be the opposite of "outgassing", and the gases desired to be re-infused within the ballast water—primarily oxygen—must (in accordance with the slow diffusion of gases through water) be placed in close proximity to the ballast water that is to be infused. This is simply accomplished, of course, merely by bubbling air through the ballast water (enhanced concentrations of oxygen gas being generally too expensive). In accordance that the ullage space (now atmospheric) gases are preferably (but not necessarily) now pressurized, the bubbles are forced into the bottom of the ballast water tank at such even greater pressure as also accounts for the head of ballast water.

Any anaerobic aquatic life within the ballast water that has previously profited from the prolonged period of oxygen deprivation is normally greatly shocked by the rapid (re-) infusion of oxygen, and is frequently successfully killed.

The system and method of the present invention for the closed loop control of both (i) the pressure and (ii) the content of ballast tank gases thus serves to at different times kill both aerobic and anaerobic organisms within the ballast water.

3. A Method of Managing the Ullage Space Gases of a Ship's Ballast Water Tank

Accordingly, in one of its aspects the present invention is embodied in a method of managing the ullage space gases of a ship's ballast water tank.

The method consists of (i) inerting the ullage space gases of a ship's ballast water tank, while (ii) de-pressurizing the same ullage space gases to a pressure less than atmosphere.

The (inerted) gases of the ballast water tank ullage space are preferably forcibly circulated in a loop through the ballast water, being forced under pressure into the ballast water at a bottom of the ballast water tank and, after bubbling upwards through the ballast water an into the ullage space, are forcibly extracted from the ullage space for re-circulation.

This closed loop circulating is preferably (i) substantially continuous for the substantial duration of a voyage of the ship, and (ii) in a flow path substantially sealed against entrance of oxygen. Indeed, the flow path is preferably so substantially sealed against entrance of oxygen that insufficient oxygen, or outside gases in general, will enter into the path during the ship's voyage so as to either (i) destroy the inerted character of the circulating gases, or (ii) cause the pressure of the circulating gases to rise to atmosphere, or both.

This substantially continuous closed loop preferably entails (1) flow communicating ballast tank ullage space gases from the ullage spaces of each of a multiplicity of ballast water tanks of the ship to a central point upon the ship, (2) balancing at this central location both the (i) inerted, and (ii) pressurized, conditions of the ullage space gases flow communicated from the multiplicity of ballast water tanks, creating a gaseous mixture which is a blended hybrid of both the (i) inerted, and (ii) pressurization, conditions of the ullage spaces of the multiplicity of ballast water tanks, and (3) supplying from the central location gases from the blended hybrid gaseous mixture back to the multiplicity of ballast water tanks. By this distribution and averaging any such ingress of (i) oxygen, and/or (ii) other gases into the circulating gases of some one ballast water tank ullage space as might respectively cause (i) the oxygen content of the gases of this one ballast water tank ullage space to exceed the oxygen threshold, and/or (ii) the pressure of the gases of this one ballast water tank ullage space to exceed the atmospheric pressure, will instead be averaged over multiplicity of ballast water tank ullage spaces, diminishing the likelihood of exceeding any inert and/or pressure limits in any one ballast water tank ullage space.

The inerted ullage space gases are preferably so inerted by addition of flue gases to the ullage space gases. The inerted ullage space gases are preferably so inerted to less than 4% oxygen by molar volume, and are more preferably inerted to less than 2% oxygen by molar volume.

The ullage space gases depressurized to a pressure less than atmosphere are preferably so depressurized by subtraction of a portion of the ballast tank ullage space gases at a time before, or concurrent with, beginning a voyage of the ship.

The ullage space gases are (then) so depressurized to a pressure that is preferably less than a −2 p.s.i. threshold pressure level below nominal atmospheric pressure of 14.7 p.s.i., or to a pressure less than 12.7 p.s.i.

This entire ship's ballast water tank ullage space gas management method may optionally be supplemented, at a time after inerting and the de-pressurizing, by further steps of (i) reversing the inerting and entering oxygen into the ullage space gases of the ship's ballast water tank so as to assume atmospheric oxygen levels or better, while (ii) also reversing the de-pressurizing, and instead pressurizing the same ullage space gases to a pressure greater than atmosphere.

4. A Method of Managing the Ullage Space of a Ballast Water Tank of a Ship

In other of its aspects the present invention is embodied in a method of managing the ullage space of a ballast water tank of a ship.

In the method the ullage space of a ballast water tank of a ship is sealed gas tight. The ullage space gases of this ballast water tank are then inerted so as to be incapable of supporting aerobic life within the ullage space of the ballast water tank. These ullage space gases are further depressurized to an initial pressure less than atmosphere, at which time the ullage space is then called an "underpressurized ullage space" and the ullage space gases ar called "underpressurized".

The method proceeds with continuing closed the ship's ballast water tank with its inerted underpressurized ullage space during a substantial portion of an entire voyage of the ship. Underpressure is maintained regardless that the ullage space gas pressure should become or temporarily become more positive because of any of (i) leakage of atmospheric gases into the tank, (ii) outgassing of gases within the ballast water contents of the tank, (iii) evaporation of the ballast water or portions thereof, and/or (iv) expansion of the ullage space gases upon thermal heating.

Likewise, the inerted condition of the (underpressurized) ullage space gases is maintained regardless that percentage oxygen within the inerted ullage space gases should increase because of any of (i) leakage of atmospheric gases into the tank, and/or (ii) outgassing of oxygen from within the ballast water contents of the tank.

The method optimally, but preferably, further entails circulating and recirculating the ullage space gases in a closed loop through the ballast tank water so that the ballast water becomes substantially incapable of supporting aquatic aerobic life.

In the method the de-pressurizing preferably transpires only once, and at the beginning of (or before) the voyage of the ship. In such case the ballast tank ullage space gas pressure preferably thereafter remains, nonetheless to potentially becoming more positive due to both leakage of outside atmospheric gases into the underpressurized ullage space and outgassing of gases initially dissolved within the ballast water, negative relative to atmosphere throughout the substantial portion of the entire voyage of the ship.

The inerting of the ballast water tank ullage space gases is preferably realized by adding flue gases to the ullage space, and to the ullage space gases.

The method is optionally continued, at a time after the inerting and the de-pressurizing, by the added steps of (i) reversing the inerting and entering oxygen into the ullage space gases of the ship's ballast water tank so as to assume atmospheric oxygen levels or better, and also (ii) reversing the depressurizing, and instead pressurizing the same ullage space gases to a pressure greater than atmosphere.

5. A Ship's Ballast Tank

In yet another of its aspects the present invention is embodiment in the ballast tank of a ship.

The ballast tank is characterized in that (i) gases of the tank's ullage space are inerted, and contain less than 4% oxygen, while (ii) these same ullage spaces gases are at a pressure less than atmosphere.

These and other aspects and attributes of the present invention will become increasingly clear upon reference to the following drawings and accompanying specification.

BRIEF DESCRIPTION OF THE DRAWINGS

Referring particularly to the drawings for the purpose of illustration only and not to limit the scope of the invention in any way, these illustrations follow:

FIG. 2 is a prior art table of the solubility of oxygen in water (both fresh and saline) exposed to water-saturated air at sea level.

DESCRIPTION OF THE PREFERRED EMBODIMENT

The following description is of the best mode presently contemplated for the carrying out of the invention. This description is made for the purpose of illustrating the general principles of the invention, and is not to be taken in a limiting sense. The scope of the invention is best determined by reference to the appended claims.

Although specific embodiments of the invention will now be described with reference to the drawings, it should be understood that such embodiments are by way of example only and are merely illustrative of but a small number of the many possible specific embodiments to which the principles of the invention may be applied. Various changes and modifications obvious to one skilled in the art to which the invention pertains are deemed to be within the spirit, scope and contemplation of the invention as further defined in the appended claims.

1. Background to the Management in Accordance With the Present Invention of Ullage Spaces Gases The (i) maintenance of an underpressure in the oil tanks of oil tankers (to avoid or mitigate outflow of oil in the event of tank rupture) is the concern of the American Underpressure System (AUPS) of assignee of the present invention MH Systems, San-Diego, Calif. AUPS is the subject of U.S. Pat. Nos. 5,156,109 for a System to reduce spillage of oil due to rupture of ship's tank, and 5,092,259 for INERT GAS CONTROL IN A SYSTEM TO REDUCE SPILLAGE OF OIL DUE TO RUPTURE OF SHIP's TANK. It is also the subject of related U.S. Pat. Nos. 5,343,822 for EMERGENCY TRANSFER OF OIL FROM A RUPTURED SHIP's TANK TO A RECEIVING VESSEL OR CONTAINER, PARTICULARLY DURING THE MAINTENANCE OF AN UNDERPRESSURE IN THE TANK; 5,323,724 for a CLOSED VAPOR CONTROL SYSTEM FOR THE ULLAGE SPACES OF AN OIL TANKER, INCLUDING DURING A CONTINUOUS MAINTENANCE OF AN ULLAGE SPACE UNDERPRESSURE; and 5,285,745 for SYSTEM TO REDUCE SPILLAGE OF OIL DUE TO RUPTURE OF THE TANKS OF UNMANNED BARGES. All patents are to the same inventor Mo Husain, and are assigned to the same assignee as is the present invention. The contents of all related predecessor patents are incorporated herein by reference.

This (i) maintenance of an underpressure plus (ii) the inerting of these same ullage spaces of oil tanks is a topic of the related predecessor application for CLOSED LOOP CONTROL OF VOLATILE ORGANIC COMPOUND EMISSIONS FROM THE TANKS OF OIL TANKERS, INCLUDING AS MAY BE SIMULTANEOUSLY SAFEGUARDED FROM SPILLAGE OF OIL BY AN UNDERPRESSURE SYSTEM. This related application is to inventors including the selfsame inventor of the present invention, is also incorporated herein by reference.

The present invention concerns the use of a similar system and method for a new purpose, namely, to prevent environmental contamination resultant from the presence of harmful aquatic organisms in a ship's ballast water discharge.

The system and method of the present invention operates with superior effectiveness and economy because the oxygen content of the ballast water is both (i) quickly reduced, normally within a period in hours, and (ii) indefinitely lengthily maintained, normally for the substantial length of ship's voyage. The greatly reduced oxygen content in ballast water efficiently kills over a period of days the substantial portion of problematic aerobic life forms. Then, as the ship nears port, the system can be reversed to (re-)enter oxygen (in the form of air) into the ballast water—killing the substantial portion of any surviving anaerobic life forms.

The reason that the (i) underpressure, and (ii) inerted, conditions in the ullage spaces of the ballast tanks are synergistic of combination is as follows.

First, the total amount of dissolved gases in the ballast water—the oxygen component of which is necessary to sustain aerobic life—is a function of the gas pressure over the ballast water. All gases, including dissolved oxygen, will exit the water optimally rapidly when no gases at all, nor any gas pressure, are present over the water. Such a condition is illustrated in the well-known high school laboratory experiment where water within a flask may be observed to "boil"—actually an outgassing of dissolved gases as well as the formation of water vapor—in the presence of a vacuum.

As discussed in the Background of the Invention section of this specification, there are already existing ballast water systems that attempt to extract gases including oxygen from ballast water by use of a partial vacuum in a separate "de-oxygenation" chamber that is flow-connected to the ballast water tank. Alas, the amount of ballast water that can be expensively processed per unit time in such a separate chamber is small, and processed water that is returned to the ballast water tank in an oxygen-depleted condition soon comes to equilibrium with the greater volume of ballast water and the atmosphere, meaning that the treated ballast water will soon be replenished with oxygen suitable to all organisms surviving the relatively short period of oxygen deprivation.

It would thus be useful if an entire ballast water tank could somehow be turned into a vacuum chamber—but this is not possible as the tank's top and walls would collapse. The best alternative in facilitating the extraction of dissolved gases—including oxygen—is to draw such lessor negative pressure as is prudent—which is exactly what the system and method of the present invention does!

Second, the relative proportion of any dissolved gas, particularly oxygen, in the ballast water is, by Henry's Gas Law, a function of the concentration—equivalent to partial pressure—of the gas (the oxygen) within the mixed gases over the ballast water. If oxygen is depleted in the ullage space gases of the ballast tank, so then also will the dissolved gases within the ballast tank water come, over time, to be depleted in oxygen.

Depletion of oxygen within ullage space gases is accomplished by inerting the gases, and this function also is innately realized by the system and method of the present invention. As with some previous systems for depleting oxygen within ballast tank water, during use the system of the present invention preferably bubbles inert gas into, and upwards through, the ballast water. Alas, the process within which the gases within the water of a ballast tank come into equilibrium concentration with the gases over the same water is normally very slow, being that the diffusion of gas (including oxygen) within water being some ten thousand times (×10,000) slower than in air.

This is where the system and method of the present invention enjoy a unique, and synergistic, effect. Liberation of gases from fluids by outgassing due to changes in gas pressure over the fluid—such as, in the extreme condition, boiling of gases within the fluid during an absence of any gas pressure—is a function of gas solubility, and has little to do with gas diffusion. Anyone who has regarded boiling water within a clear glass container can observe gas bubbles to form throughout the volume of the water, with scant requirement for contained gases to diffuse any appreciable distance through the water.

In the system and method of the present invention (i) extraction of gases from ballast waters is facilitated by action of the underpressure simultaneously that (ii) the gas that is—by equilibrium with the then-existing partial pressures of inerted gases within the ullage space of the ballast tank—most pronouncedly extracted is oxygen! Although the precise natures and sizes and numbers of organisms that must be successfully killed in order to render foreign ballast water safe for discharge in American waters is subject to continuing debate, the system and method of the present invention establish (i) higher degrees of oxygen deprivation (ii) faster (iii) for a more substantial portion of any voyage at (iv) a lower cost than any competing system known to the inventor.

2. The Preferred System and Method of the Present Invention

The system and method of the present invention facilitate the rapid and deep deoxygenation of the ballast water in order to kill aerobic (i.e., $O_2$ consuming) marine organisms. During the preferably extensive times that the ballast water tanks are substantially devoid of oxygen, corrosion will also be inhibited The technical approach of the present invention is discussed in following section 2.1; the applicability of the invention in section 2.2; and a supporting analysis of the operation and effectiveness of the invention in section 2.3.

2.1 Technical Approach

Technology options for ballast water treatment includes deoxygenation to kill microorganisms. The basic technique is the transfer of dissolved oxygen in the ballast water to a gas with a low oxygen content. Various methods of realizing this transfer were analyzed and investigated.

First, the use of a high vacuum in a separate chamber that recycles the water of the ballast tanks—as in the prior art—is analyzed.

Second, the effect of simply bubbling inert (nitrogen) gas through the ballast water tanks (which remain at atmosphere) is analyzed.

Third and finally, the bubbling of inert gas through the ballast water tanks while maintaining a moderate underpressure in the ullage spaces of these tanks—in accordance with the present invention—is analyzed.

In all approaches the goal is, of course, to kill within a timely period aerobic marine organisms by a reduction of the dissolved oxygen in the ballast water, preferably to a level of solubility of less than 1 part per million (PPM) or 1 mg/L.

Considering first the high vacuum approach, note immediately that it requires the installation of a separate chamber that must structurally withstand the enormous crushing loads. It is not structurally possible to pull a high vacuum in the ballast tank of a ship. Even should the tank be effectively sealed, it would collapse under atmospheric pressure (as is reflected both in the atmosphere above the tank and in the ocean waters around the tank). Furthermore, the use of an off-line vacuum tank for oxygen purging must contend with the sludge, sediment and residual water in the recycling process. Finally, if the entire contents of the ballast tank cannot be depleted of oxygen all at once and at the same time, it is believed possible for marine organisms to withstand a short period of even total oxygen deprivation within a vacuum chamber, and to revive upon return to the much more voluminous waters of the ballast tank which, although gradually becoming diminished in oxygen, cannot fairly be said to become depleted of oxygen to hypoxic levels.

Next considered is replacing, or at least supplanting, the time-consuming mass transfer of the dissolved oxygen within the ballast water at the surface of this liquid by (additionally) bubbling the gas through the ballast tanks. This method of transfer is by a movement of bulk material (forced convection), bringing the gas to the vicinity of the widely dispersed oxygen molecules dissolved in the ballast water. The surface area over which gas exchange transpires is greatly increased. Alas, by the analysis of section 2.3, following, the mere increase in the area over which the process of gas exchange transpires is, within the limits of such areas and bubble sizes as are realizable in ballast tanks at sea, insufficient to speedily establish a new gas, and particularly oxygen, balance in the ballast water.

The preferred method, supported by the analysis of section 2.3 following, is to combine (i) bubbling of inerted, oxygen-depleted, ullage space gases with (ii) and underpressure, or pressure less than atmosphere, within the ullage spaces (and the bubbled gases).

It should immediately be noted that the gas handling necessary for such a system is already present in the AUPS as is the subject of the related patent application. Indeed, such a system has the cost and operational advantages of an on-board inert gas supply and the ducting/blowers to collect and vent the circulated gases to the atmosphere. Instead of being used to control the outflow of oil from the ruptured tanks of oil tankers (which tanks are appropriately inerted during all conditions of loading, transport and unloading) such an AUPS can in the present application remove dissolved oxygen to levels below 1 PPM, as next explained.

2.2 The Relationship of the System and Method of the Present Invention to the American Underpressure System (AUPS)

The system and method of the present invention is related to the so-called American Underpressure System (AUPS) for the control of the spillage of oil from the ruptured tanks of oil tankers.

In the system and method of the present invention, a ship's fill and discharge functions and procedures for its ballast water remain substantially unchanged, and are performed with existing equipment and procedures.

Figure 1:
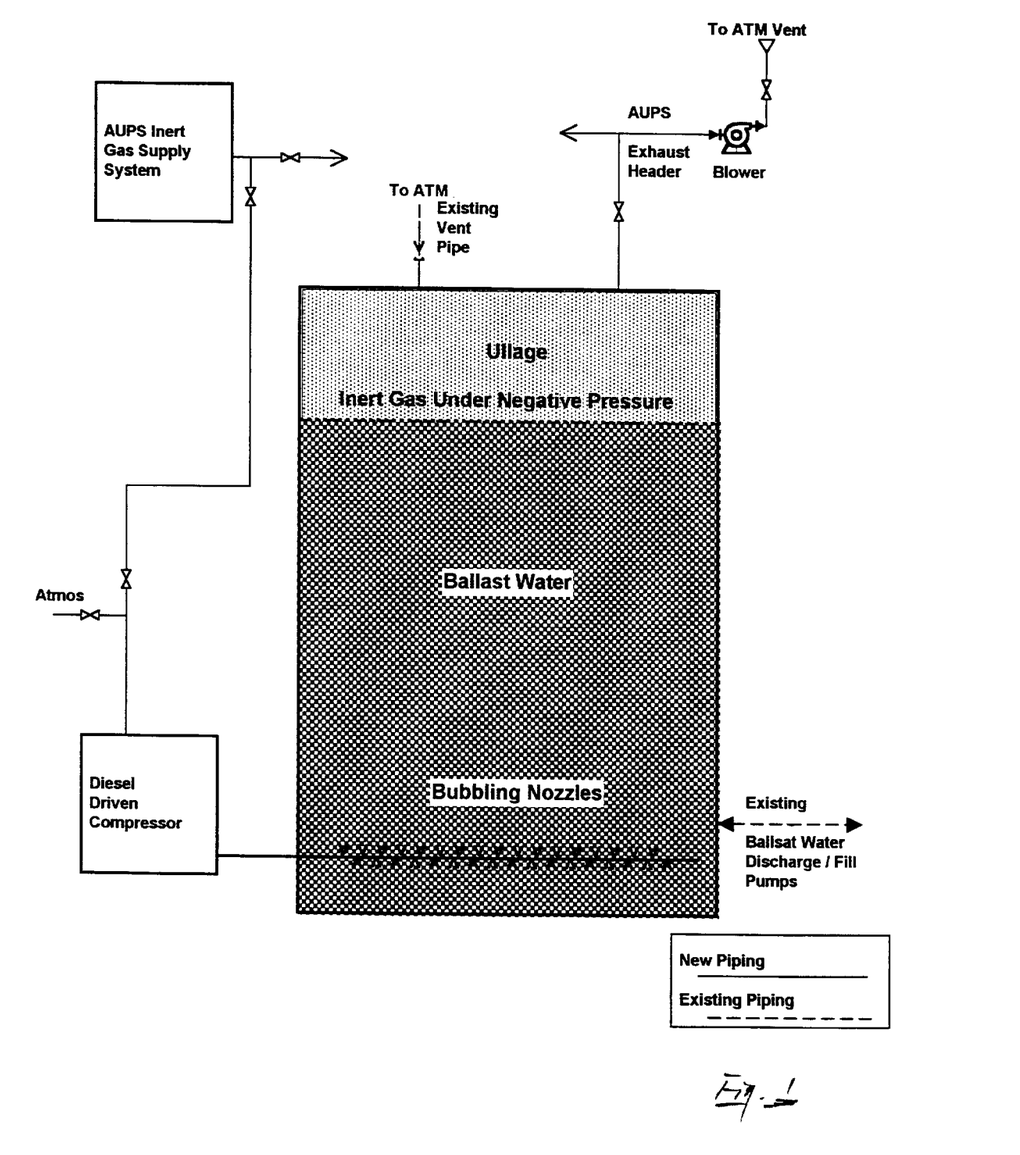
FIG. 1 is a schematic block diagram of a preferred embodiment of a ballast tank (i) ullage space, and (ii) ballast water, gas control system of the present invention.

The schematic diagram of a preferred system of the present invention shown in FIG. 1 particularly separates out the arrangement and modifications to an AUPS-type system required to extend the primary spill/emission containment mission of such a system into the area of ballast water treatment. Please consider that a contingency operational mode of AUPS already requires the open-loop circulation of inert gas, supplied by a combustion gas generator ($O_2$~2% by volume) to the cargo tank ullage spaces, before venting ullage space gases to the atmosphere via blower/controls.

In accordance with the present invention, a standard AUPS-type system is reconfigured for ballast water treatment by diverting the inert gas to the bottom of the ballast tanks via an off-the-shelf, diesel-driven reciprocating compressor. The boosted pressure of the inert gas in bubbled through an array of nozzles located in the ballast tanks, up to the liquid/gas surface. The bubbling facilitates contact of the gas with the sparsely located dissolved oxygen molecule. The ullage gases are then vented to the atmosphere via an exit header containing blowers. The whole system is controlled by (i) pressure sensors, and, most preferably, (ii) computers (although computers are not necessary), so as to maintain the desired underpressure in the ballast tank ullage spaces.

The operational sequence in-transit is as follows:

First, the all cargo and ballast tanks ullage spaces are temporarily isolated.

Second, an existing AUPS, or a new system performing its substantial function, is set to operational mode 2 (as explained in the companion patent application) for open-loop gas circulation.

Third, the combustion gas generator (or other source of inert gas, such as bottles of nitrogen) is enabled, boosting the pressure of the inert gas(e)s and diverting this (these) inert gas(es) to the manifold at the bottom of the ballast water tanks.

Fourth, the inert gas(es) are then bubbled through ballast water, and are vented through the normal AUPS exhaust header assembly (or equivalent).

Fifth, the bubbling is continued until the solubility of oxygen within the ballast water is <1 PPM.

Six, the ship is return to AUPS operation mode/configuration for spill/emission control if the ship is so equipped with an AUPS (which is most characteristic of an oil tanker), or otherwise the use of the system in underpressure mode is completed.

Seventh, the system (as regards the ballast tanks) may optionally be run with the compressors reversed, the gas flow paths partially reversed, and the valves aligned as will force oxygenated atmospheric gases through the ballast water tanks.

2.3 Supporting Analysis 2.3.1 Analysis 1

An analysis was examining the feasibility of deoxygenation of ballast water to less than 1 PPM shows that this depletion can be completed in a timely manner in accordance with the present invention.

Henry's gas law states that the solubility of a gas dissolved in a liquid is proportional to the partial pressure of the gas surrounding the liquid. The system of the present invention employs this principle by using inert gas at a moderate underpressure and a low oxygen content (2% by volume) to obtain the desired solubility of oxygen in water.

The following facts are known. The solubility of untreated sea water=6.5 mg/L from Table 1 of FIG. 2 for a temperature of 27° C.

The partial pressure of oxygen in dry air=21%×14.7= 3.087 PSIA.

The partial pressure of oxygen in an inert gas used in the ullage space may be calculated as follows. The initial inert gas supply pressure=16.7 PSIA where the $O_2$ content=2% by volume. The pressure of the ullage space when underpressurized to 2 PSI less than atmosphere (=14.7 PSI)=12.7 PSIA.

The partial pressure of oxygen within the inerted ullage space gases thus=2%×12.7=0.254 PSIA Meanwhile, the solubility of ballast water ($T_w$=27° C.) treated with this inert gas mixture=6.5 mg/L×((0.2543)/(3.087))=0.53 mg/L=0.53 PPM.

A sensitivity study evaluated the solubility over a range of ballast water temperatures of:

a) 15° C. at 0.8 solubility,
b) 20° C. at 0.6 solubility, and
c) 27° C. at 0.5 solubility.

The analysis indicates that the solubility remains below 1 PPM with the approach of the present invention. Analysis of a high vacuum using the same principles show the gas pressure must be reduced to 2.0 PSIA (an underpressure of 12.7 PSI) to achieve a solubility of 1 PPM.

2.3.2 Analysis 2

The time required to achieve desired solubility in the ballast tanks with mass transfer by diffusion was analyzed as follows:

The following candidate ballast tank and input conditions were assumed using the mechanism of mass transfer by diffusion in the liquid. The resistance of the boundary layer on the gas side is neglected (highly volatile).

The characteristics of a ballast tank for, by way of example, a 75,000 DWT tanker, are as follows. The tank size equals 100 ft (l)×30 ft (w)×50 ft (h). The tank volume=150× $10^3$ ft$^3$ (4.2×106 L). The surface area of the (water) liquid within the tank=3×10$^3$ ft$^2$ (2.78×10$^6$ cm$^2$). The weight of water within the tank=4.3×10$^9$ g.

Meanwhile, the supply of inert gas is preferably generated by a combustion gas generator. The pressure of this gas=+2 PSI (16.7 PSIA). It's temperature=+20° C. above sea water. Its $O_2$ content=2% by volume. It is normally saturated with water vapor.

Meanwhile, the sea water ballast of the tank is typically (after heating under the deck plates in a southern ocean) at a temperature=80° F. (27° C.). The initial pressure is, or course, ATM (i.e., atmospheric). The sea water is saturated with $O_2$. It has a density=1.027 gm/L.

Calculation of the moles/liter of dissolved oxygen may thus proceed as follows. For the untreated ballast water (at the bottom of the ballast tank) this may be calculated as (weight/L)/(molecular weight)=(6.845×10$^{-3}$ g)/32=0.21× 10$^{-3}$. Equivalently, for the treated ballast water at the top surface of the ballast tank, the equivalent calculation=(0.53× 10$^{-3}$)/(32)=0.016×10$^{-3}$.

The mass transfer resulting from diffusion of $O_2$ in this sea water transpires with a flux rate (F)=(D/Δx) ($C_1$–$C_2$) moles/cm$^2$-sec where D=Diffusivity=1.89×10$^{-5}$ cm$^2$/sec; x the distance between $C_1$ and $C_2$=50 ft=1.5×10$^3$ cm; $C_1$=the concentration of $O_2$ in solvent at the bottom of the ballast tank in moles/cc; and $C_2$=the concentration of $O_2$ in solvent at the liquid/gas surface in moles/cc.

Calculating, $C_1$=oxygen concentration in the untreated ballast water=0.21×10$^{-3}$ moles/L=0.21×10$^{-3}$ moles/cc. And $C_2$=oxygen concentration in the treated ballast water= 0.016×10$^{-6}$ moles/cc.

The flux rate F thus=[0.21×10$^{-6}$–0.016×10$^{-6}$]=0.24×10$^{-14}$ moles/cm$^2$-sec. Over the surface area of the ballast tank which surface area=2.78×10$^6$ cm$^2$, this flux F thus=0.24× 10$^{-14}$×2.78×10$^6$=0.68×10$^{-8}$ moles/sec.

Now, as before, the volume of the ballast tank=150×10$^3$ ft$^3$=4.24×10$^9$ cm$^3$. The number of moles $O_2$ in the (ballast water of) the untreated ballast tank thus=moles/cc×tank volume (in cc)=0.21×10$^{-6}$×4.24×10$^9$=0.9×10$^3$ moles.

Likewise, the number of moles $O_2$ in the (ballast water of) the treated ballast tank=moles/cc×tank volume (in cc)= 0.016×10$^{-6}$×4.24×10$^9$=0.06×103 moles.

The time for the ballast water in the to come to equilibrium in oxygen content with the inerted atmosphere in the ullage space above the water equals the number of moles of oxygen removed divided by the removal, or flux, rate F. This=(0/9×10$^3$–0.06×10$^3$)/(0.68×10$^3$)=1.2×10$^{11}$ sec. Considering that 1 month=2×10$^6$ seconds, the months required to complete gas transfer, and to come to equilibrium, by diffusion=(1.2×10$^{11}$)/(2×10$^6$)=0.6×10$^5$.

Ergo, de-oxygenation (or for that matter, re-oxygenation) by mass transfer of oxygen molecules by process of diffusion is too time consuming.

In accordance with the present invention, oxygen is removed from the ballast water by outgassing, being the spontaneous generation of bubbles throughout the volume of the ballast water when it is subjected to a new and more negative pressure. The bubbles rise rapidly to the surface, and equilibrium is quickly restored.

Further in accordance with the present invention, inert gas is bubbled through the ballast water in the tank. Although the process of the interchange of gases, including oxygen, between the water and these bubbles is diffusion, just as at the surface of the ballast water tank, the combined surface areas of the bubbles is much greater than that of the top of the water in the tank, and when these bubbles are inert gas then oxygen is preferentially scavenged from the tank. This process makes not only that the overall amount of gas dissolved within the ballast water (quickly) falls to match the new, underpressurized, condition of the tank ullage space, but that the percentage of each dissolved gas—and particularly oxygen—tank changes to reflect the new partial gas pressures within the (inerted) gases of the ullage space over the ballast water.

Accordingly, in the method of the present invention gas, and particularly oxygen, transfer is predominantly by movement of bulk material (the oxygen) by process of convection, and not by diffusion. The ballast water is deoxygenated (to the predetermined extent preferably <4% $O_2$ and more preferably <2% $O_2$) in but a relatively short time of, typically, some few hours.

The entire process is to substantially reversible, and is especially so reversible when (i) the pressure less than atmosphere in the ballast tank ullage space is changed to a pressure greater than atmosphere simultaneously that (ii) mixed gases containing oxygen—normally fresh air for reasons of cost—are bubbled (necessarily under pressure) through the ballast water (which is depleted in all gases relative to equilibrium at atmosphere (or above), but which is especially depleted in oxygen). The circulating gases are "pressured" into the ballast water, which "sops up" these gases. In a matter of, most typically, only some few hours the full oxygen balance in the ballast water is restored.

This cycle from de-oxygenated to oxygenated ballast water, which can be repeated if necessary, is very stressful on aquatic life within the ballast water. Contrary to the aphorism that a frog will jump from attempted immersion boiling water, but will remain until dying in water gradually heated, the problem for some marine life (both aerobic and anaerobic) in surviving this cycle seems not so much to be persistence through adverse periods but the recognition of, and/or successful response to, the rapid onset of these periods. Anaerobic aquatic life that is in particular sometimes difficult to kill quite naturally seems to commence to flourish in de-oxygenated ballast water conditions. When rapid re-oxygenation "hits" this life then the effect may be greater than a more gradual onset of aerobic conditions.

In accordance with these and other possible variations and adaptations of the present invention, the scope of the invention should be determined in accordance with the following claims, only, and not solely in accordance with that embodiment within which the invention has been taught.

What is claimed is:

1. A method of managing the ullage space gases of a ship's ballast water tank comprising:
   inerting the ullage space gases of a ship's ballast water tank; while
   de-pressurizing the same ullage space gases to a pressure less than atmosphere.

2. The ship's ballast water tank ullage space gas management method according to claim 1
   wherein the gases of the ballast water tank ullage space are forcibly circulated in a loop through the ballast water, being forced under pressure into the ballast water at a bottom of the ballast water tank and, after bubbling upwards through the ballast water an into the ullage space, are forcibly extracted from the ullage space for re-circulation.

3. The ship's ballast water tank ullage space gas management method according to claim 2
   wherein the closed loop circulating is substantially continuous for the substantial duration of a voyage of the ship.

4. The ship's ballast water tank ullage space gas management method according to claim 3
   wherein the closed loop circulating substantially continuous for the substantial duration of the voyage of the ship is in a flow path substantially sealed against entrance of oxygen.

5. The ship's ballast water tank ullage space gas management method according to claim 4
   wherein the closed loop circulating substantially continuous for the substantial duration of the voyage of the ship in the flow path is so substantially sealed against entrance of oxygen that insufficient oxygen will enter into the path during the ship's voyage so as to either (i) destroy the inerted character of the circulating gases, or (ii) cause the pressure of the circulating gases to rise to atmosphere, or both.

6. The ship's ballast water tank ullage space gas management method according to claim 4
   wherein the closed loop circulating substantially continuous for the substantial duration of the voyage of the ship in the flow path is so substantially sealed against entrance of outside gases that insufficient outside gases will enter into the path during the ship's voyage so as to either (i) destroy the inerted character of the circulating gases, or (ii) cause the pressure of the circulating gases to rise to atmosphere, or both.

7. The ship's ballast water tank ullage space gas management method according to claim 4 wherein the substantially continuous closed loop circulating comprises:
   flow communicating ballast tank ullage space gases from the ullage spaces of each of a multiplicity of ballast water tanks of the ship to a central point upon the ship;
   balancing at the central location both the (i) inerted, and (ii) pressurized, conditions of the ullage space gases flow communicated from the multiplicity of ballast water tanks, creating a gaseous mixture which is a blended hybrid of both the (i) inerted, and (ii) pressurization, conditions of the ullage spaces of the multiplicity of ballast water tanks; and
   supplying from the central location gases from the blended hybrid gaseous mixture back to the multiplicity of ballast water tanks;
   wherein any such ingress of (i) oxygen, and/or (ii) other gases into the circulating gases of some one ballast water tank ullage space as might respectively cause (i) the oxygen content of the gases of this one ballast water tank ullage space to exceed the oxygen threshold, and/or (ii) the pressure of the gases of this one ballast water tank ullage space to exceed the atmospheric pressure, will instead be averaged over multiplicity of ballast water tank ullage spaces, diminishing the likelihood of exceeding any inert and/or pressure limits in any one ballast water tank ullage space.

8. The ship's ballast water tank ullage space gas management method according to claim 1
   wherein the inerted ullage space gases are so inerted by addition of flue gases to the ullage space gases.

9. The ship's ballast water tank ullage space gas management method according to claim 1
   wherein the inerted ullage space gases are so inerted to less than 4% oxygen by molar volume.

10. The ship's ballast water tank ullage space gas management method according to claim 9
    wherein the inerted ullage space gases are so inerted to less than 2% oxygen by molar volume.

11. The ship's ballast water tank ullage space gas management method according to claim 1
    wherein the ullage space gases depressurized at a pressure less than atmosphere are so depressurized by subtraction of a portion of the ballast tank ullage space gases at a time before, or concurrent with, beginning a voyage of the ship.

12. The ship's ballast water tank ullage space gas management method according to claim 1
    wherein the ullage space gases are depressurized to a pressure less than a −2 p.s.i. threshold pressure level below nominal atmospheric pressure of 14.7 p.s.i, or to a pressure less than 12.7 p.s.i.

13. A ship's ballast water tank ullage space gas management method comprising:
    inerting the ullage space gases of a ship's ballast water tank; while
    de-pressurizing the same ullage space oases to a pressure less than atmosphere; then
    reversing the inerting and entering oxygen into the ullage space gases of the ship's ballast water tank so as to assume atmospheric oxygen levels or better; while
    reversing the depressurizing, and instead pressurizing the same ullage space gases to a pressure greater than atmosphere.

14. A method of managing the ullage space of a ballast water tank of a ship comprising:
    sealing substantially gas tight an ullage space of a ballast water tank of a ship;
    inerting the ullage space gases of the ballast water tank so as to be incapable of supporting aerobic life within the ullage space of the ballast water, tank;
    depressurizing the ullage space of the ballast water tank to an initial pressure less than atmosphere, which is then called an underpressurized ullage space; and
    continuing closed the ship's ballast water tank with its inerted underpressurized ullage space during a substantial portion of an entire voyage of the ship regardless that
    1) ullage space gas pressure should become or temporarily become more positive because of any of (i) leakage of atmospheric gases into the tank, (ii) outgassing of gases within the ballast water contents of the tank, (iii) evaporation of the ballast water or portions thereof, and/or (iv) expansion of the ullage space gases upon thermal heating, and 2) regardless that percentage oxygen within the inerted ullage space gases should increase because of any of (i) leakage of atmospheric gases into the tank, and/or (ii) outgassing of oxygen from within the ballast water contents of the tank.

15. The method according to claim 14 further comprising:

circulating and recirculating the ullage space gases in a closed loop through the ballast tank water so that the ballast water becomes substantially incapable of supporting aquatic aerobic life.

16. The method according to claim 14 wherein the depressurizing transpires only once at the beginning of the voyage of the ship and the ballast tank ullage space gas pressure thereafter remains, nonetheless to potentially becoming more positive due to both leakage of outside atmospheric gases into the underpressurized ullage space and outgassing of gases initially dissolved within the ballast water, negative relative to atmosphere throughout the substantial portion of the entire voyage of the ship.

17. The method according to claim 14 wherein inerting of the ballast water tank ullage space gases comprises:

adding flue gases to the ullage space.

18. The method according to claim 14 where, at a time after the inerting and the depressurizing, further comprises the steps of:

reversing the inerting and entering oxygen into the ullage space gases of the ship's ballast water tank so as to assume atmospheric oxygen levels or better; while reversing the depressurizing, and instead pressurizing the same ullage space gases to a pressure greater than atmosphere.

19. A ballast tank of a ship CHARACTERIZED IN THAT gases of the tank's ullage space gases are inerted, and contain less than 4% oxygen; while these same ullage spaces gases are at a pressure less than atmosphere.

* * * * *